(12) United States Patent
Niemiec et al.

(10) Patent No.: US 12,529,473 B2
(45) Date of Patent: Jan. 20, 2026

(54) COMBINATION FAN, LED LIGHT AND EQUIPMENT COOLING APPARATUS

(71) Applicants: Darrin W. Niemiec, Schaumburg, IL (US); William J. Carlson, Schaumburg, IL (US)

(72) Inventors: Darrin W. Niemiec, Schaumburg, IL (US); William J. Carlson, Schaumburg, IL (US)

(73) Assignee: Go Fan Yourself, LLC, Long Grove, IL (US)

( * ) Notice: Subject to any disclaimer, the term of this patent is extended or adjusted under 35 U.S.C. 154(b) by 0 days.

(21) Appl. No.: 18/908,078

(22) Filed: Oct. 7, 2024

(65) Prior Publication Data

US 2025/0027640 A1 Jan. 23, 2025

Related U.S. Application Data

(63) Continuation of application No. 18/198,442, filed on May 17, 2023, now Pat. No. 12,111,045, which is a
(Continued)

(51) Int. Cl.
| | |
|---|---|
| *F21V 29/67* | (2015.01) |
| *F21V 3/00* | (2015.01) |
| *F21V 3/04* | (2018.01) |
| *F21V 29/61* | (2015.01) |
| *F21V 33/00* | (2006.01) |
| *F24F 7/007* | (2006.01) |
| *F21S 8/02* | (2006.01) |

(Continued)

(52) U.S. Cl.
CPC ............. *F21V 29/673* (2015.01); *F21V 3/00* (2013.01); *F21V 3/049* (2013.01); *F21V 29/61* (2015.01); *F21V 29/677* (2015.01); *F21V 33/0092* (2013.01); *F24F 7/007* (2013.01); *F21S 8/026* (2013.01); *F21V 5/02* (2013.01); *F21V 9/08* (2013.01); *F21V 29/508* (2015.01); *F21V 29/83* (2015.01); *F21Y 2103/10* (2016.08); *F21Y 2113/00* (2013.01); *F21Y 2113/10* (2016.08); *F21Y 2115/10* (2016.08); *F24F 2221/02* (2013.01); *F24F 2221/14* (2013.01)

(58) Field of Classification Search
CPC .. F21V 29/673; F21V 29/677; F21V 33/0092; F24F 13/062; F24F 13/078
See application file for complete search history.

(56) References Cited

U.S. PATENT DOCUMENTS

| | | |
|---|---|---|
| 6,497,840 B1 | 12/2002 | Palestro |
| 2018/0347574 A1 | 12/2018 | Niemiec |

(Continued)

*Primary Examiner* — Sean P Gramling
(74) *Attorney, Agent, or Firm* — Vitale Vickrey Niro Solon & Gasey LLLP

(57) ABSTRACT

A combination axial fan and LED lighting system. The system includes a housing container and an axial fan. The fan has a fan cavity including air diversion mechanism to direct air from the fan cavity toward the lighting and fan components. The invention includes an airflow surface to direct air existing the fan cavity along an LED light fixture. The invention includes a vented mechanical equipment casing configured to include an opening to direct a portion of the air exiting the fan cavity into an equipment chamber housing the mechanical equipment and configured to direct the air to encounter the mechanical equipment and operate to reduce the temperature of the equipment.

11 Claims, 15 Drawing Sheets

Related U.S. Application Data continuation-in-part of application No. 18/122,232, filed on Mar. 16, 2023, now Pat. No. 12,281,785, which is a continuation of application No. 17/492,778, filed on Oct. 4, 2021, now Pat. No. 11,608,974, which is a continuation of application No. 16/460,217, filed on Jul. 2, 2019, now Pat. No. 11,137,134, which is a continuation of application No. 15/991,038, filed on May 29, 2018, now Pat. No. 10,337,716, which is a continuation of application No. 15/471,762, filed on Mar. 28, 2017, now Pat. No. 10,006,619.

(60) Provisional application No. 62/439,719, filed on Dec. 28, 2016.

(51) Int. Cl.
*F21V 5/02* (2006.01)
*F21V 9/08* (2018.01)
*F21V 29/508* (2015.01)
*F21V 29/83* (2015.01)
*F21Y 103/10* (2016.01)
*F21Y 113/00* (2016.01)
*F21Y 113/10* (2016.01)
*F21Y 115/10* (2016.01)

(56) References Cited

U.S. PATENT DOCUMENTS

| | | |
|---|---|---|
| 2019/0072288 A1 | 3/2019 | Niemiec |
| 2019/0323696 A1 | 10/2019 | Niemiec |
| 2023/0349544 A1 | 11/2023 | Niemiec |

US 12,529,473 B2

COMBINATION FAN, LED LIGHT AND EQUIPMENT COOLING APPARATUS

PRIORITY CLAIM

This application is a continuation-in-part of U.S. patent application Ser. No. 18/122,232 filed on Mar. 16, 2023, which is a continuation of U.S. patent application Ser. No. 17/492,778 filed on Oct. 4, 2021 and which will issue as U.S. Pat. No. 11,608,974 on Mar. 21, 2023, which is a continuation of U.S. patent application Ser. No. 16/460,217 filed on Jul. 2, 2019, issued as U.S. Pat. No. 11,137,134 on Oct. 5, 2021, which is a continuation of U.S. patent application Ser. No. 15/991,038, filed May 29, 2018, issued as U.S. Pat. No. 10,337,716 on Jul. 2, 2019, which is a continuation of U.S. patent application Ser. No. 15/471,762, filed on Mar. 28, 2017, issued as U.S. Pat. No. 10,006,619 on Jun. 26, 2018, which claims priority from Provisional Patent Application Ser. No. 62/439,719 filed on Dec. 28, 2016.

FIELD OF THE INVENTION

The present invention relates to the combination fan, LED light and equipment cooling system that is built into a housing that may be the footprint of an office ceiling tile or other configuration capable of being configured to fit onto an office space. More particularly, the present invention provides for a troffer shell to house both the light and fan in a configuration to direct airflow across the LED light fixture and through an outlet. The present invention also includes a vented mechanical equipment casing housing the mechanical equipment which supply power to the fan and LED lights, wherein the prism is perforated to permit air from the fan to flow over the mechanical equipment to provide a cooling effect on the LED equipment. The present invention may utilize the fan blade technology disclosed in U.S. patent application Ser. Nos. 14/814,161, 15/043,923 and 15/346,913 each of which are incorporated herein by reference in their entirety.

BACKGROUND OF THE INVENTION

Indoor spaces such as offices, hospitals, educational institutions and the like have two main issues: (1) maintaining air quality and air movement; and (2) providing adequate and proper lighting. Indoor spaces often have only a single HVAC system that provides air and heat to all of the different sized offices or rooms within a space. Separately, the indoor space utilizes a series of LED lights that are mounted in ceiling tiles having a dimension of 2 ft.×2 ft. or 2 ft.×4 ft. There is a need for a system which can move air within an indoor space which supplements the primary HVAC system while at the same time providing ample lighting within the indoor space while fitting into the dimensions of a ceiling tile. The system also can provide a cooling effect on the LED lights and mechanical equipment to prolong the life-span of the lights and mechanical equipment.

Excessive heat causes damage to LED lights and the mechanical equipment which provides power to the LED lights. LED bulbs that produce white light typically generate excessive heat that must be conducted away from the LED light system. Proper thermal management is critical to maintaining the original brightness and extending the lifespan of LED lights. Unfortunately, due to component costs, many manufacturers do not include the materials or structures necessary to provide proper heat transfer, thereby reducing the performance of the product. For example, most LED lighting manufacturers use less expensive and less reliable circuit boards that do not transfer heat well. Heat build-up in LED lights and the mechanical equipment powering the LED lights will damage the material, decrease the effectiveness of the light and decrease the lifespan of the lighting unit.

The secret to a successful LED fixture design is proper thermal management. There are several factors that affect the thermal performance of any fixture including the ambient air temperature, but LEDs specifically suffer from improper thermal design. The displacement of waste heat produced by LED lights is paramount to the longevity of the LED lights and the associated mechanical equipment which can provide an advantage to a company in the emerging LED lighting industry.

The energy consumed by an incandescent bulb produces around 12% heat, 83% infrared radiation and only 5% visible light. A typical LED light produces 15% visible light and 85% heat. It is important to dissipate heat from LED's through efficient thermal management. The operating temperature of an LED light affects the lifespan of the LED. LED lights do not tend to fail catastrophically, instead the lumen output of the LED decreases over time. Elevated internal temperatures of the LED cause accelerated deterioration of the LED lights.

Further, in an office or indoor environment, the absence of adequate ventilation causes irritating or harmful contaminants to accumulate, which causes worker discomfort, health problems and reduced performance levels. Air purification is an important part of an HVAC system. A typical indoor HVAC system is not a substitute for source control or ventilation.

Thus, there is a need for combination fan and LED light fixture system that fits into the footprint of a typical ceiling tile.

SUMMARY OF THE INVENTION

The present invention relates to a combination of an LED light system and an axial or crossflow fan which is configured within a housing which may be adapted to be inserted into a foot-print of a typical ceiling tile.

The present invention further utilizes a small flow fan that operates to propel air along the surface of an LED light system including both the LED light fixture and the mechanical equipment powering the LED light fixture. In one embodiment, the fan is configured to intake cooler air from the lower portion of an office space through the ceiling fixture. Pushing relatively cooler air through the fixture causes convective heat transfer over the LED lights and associated mechanical equipment. The reduction in temperature has a significant impact on the life of the drive system of the fan, the lighting ballast and the LED components.

The present invention further includes an air diversion mechanism positioned in proximity to the fan to equally distribute the air propelled by the fan to all sides of the fixture. The air diversion mechanism provides equal distribution of the air throughout the fixture which provides for equal air movement and heat transfers across the LED lighting fixtures. The housing for the air dispersion system may also be used to house the ballast, drivers and wires of the lighting and fan systems.

The present invention also includes a vented mechanical equipment casing housing the mechanical equipment which supply power to the fan and LED lights, wherein the vented mechanical casing is configured to include perforations which permit air from the fan to flow over the mechanical equipment to provide a cooling effect on the mechanical equipment.

The present invention combines the benefit of savings in electrical energy with savings in HVAC energy costs in one unit.

The present invention further includes the benefit of adapting the fan and LED lighting fixture to fit into an office space and may be configured to fit into the footprint of a ceiling tile to permit installation of the fixture in standard ceiling tile configurations, thus maintaining the aesthetics of the ceiling. There are other types of office structures that the LED light fixture may be configured to fit into.

The present invention includes the benefit of moving air in an indoor space to provide more efficient heating of the indoor space.

The present invention may include the stepped fan blade technology of U.S. patent application Ser. Nos. 14/814,161, 15/043,923 and 15/346,913 which are all incorporated herein by references in their entirety. The stepped-fan blade technology provides the benefit of moving air through the fixture in a more efficient manner thereby reducing the amount of energy required to operate the unit. The stepped blade technology also enables the fan to operate at a lower speed thus utilizing less energy and reducing noise. Finally, the stepped-fan blade technology disperses the air in a uniform manner.

The present invention provides the additional benefit of enhancing the life of all of the electrical fixtures (both the lighting and fan fixture) by reducing the amount of deterioration on each fixture caused by heat.

The present invention will also enhance the foot-candles per watt performance of the lighting optics by reducing the temperature of the LED light. The present invention reduces the problem of the LED light degrading over time due to an increase in temperature.

This design of the present invention will also enhance the ability to self-clean the lens on the LED face by utilizing air to push any dust or debris away from the lighting fixture.

This design of the present invention provides for a competitive advantage in that it permits electrical hook up in one complete unit that used to require two separate electrical connections, one for the fan and one for the light.

An added benefit of the present invention provides for a filter to clean the air that comes through the perforations of the intake or the screen of the light fixture—therefore creating a cleaner air environment.

The present invention may utilize various color schemes in the troffer shell to impact various behavior traits of a person. Color is believed to profoundly affect the productivity of a person. Research has shown that blue color is believed to affect a person's mind; yellow is believed to affect a person's emotions; red is believed to affect a person's body; and green is believed to affect a person's balance. Utilizing these colors in the present invention, the colors can affect a person's behavior.

Finally, the present invention presents a benefit of elimination of any strobing effect caused by the fan blades interfering with the light distribution.

These and other objects and advantages of the present invention, as well as the details of the illustrative embodiment, will be more fully understood from the following specification and drawings.

DETAILED DESCRIPTION OF THE PREFERRED EMBODIMENTS OF THE INVENTION

Figure 1:
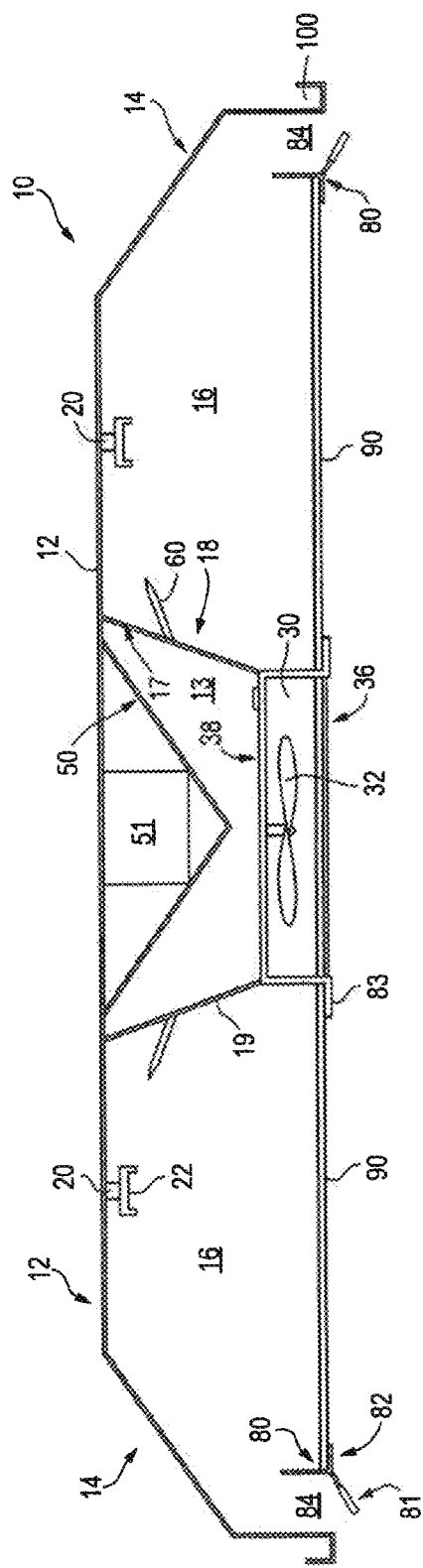
FIG. 1 is a sectional view of one embodiment of the combination light and fan fixture depicting a troffer shell.
Figure 2:
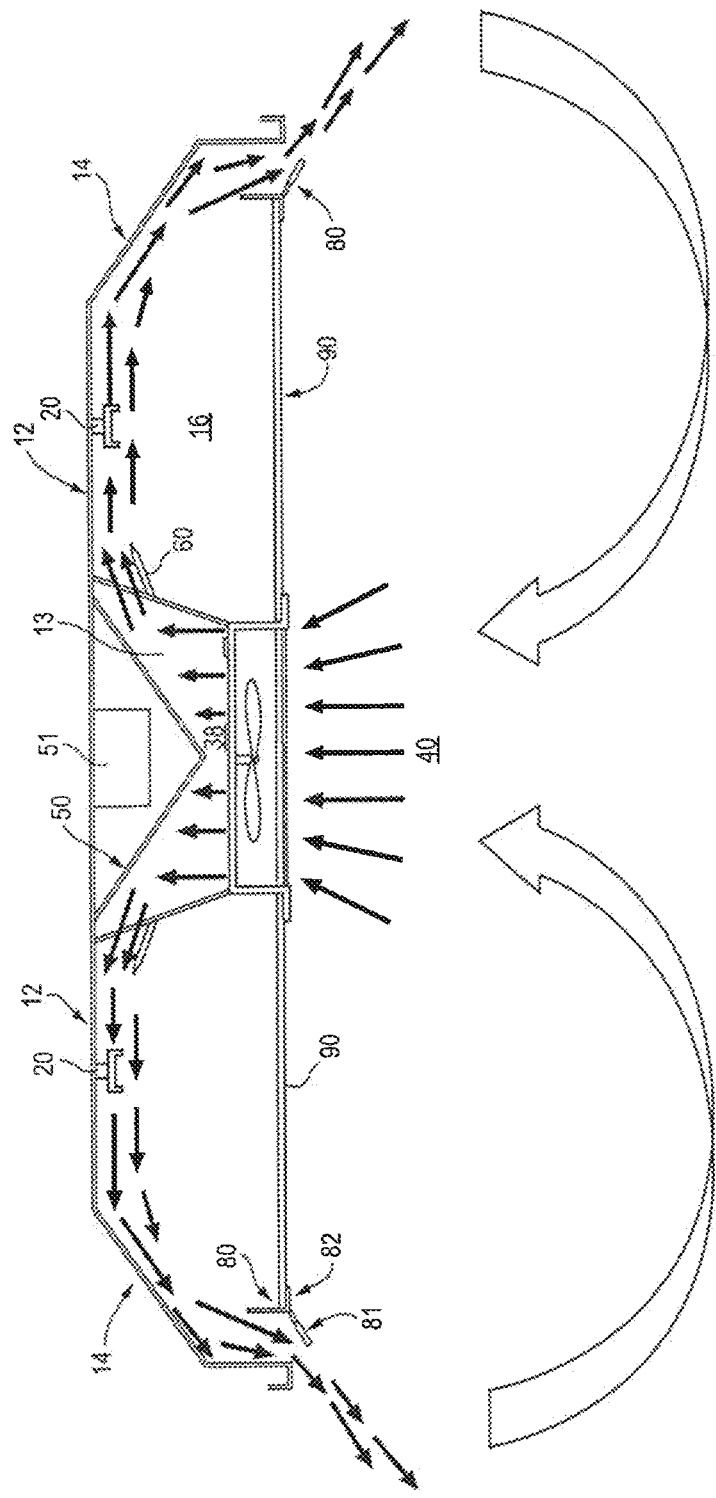
FIG. 2 is a sectional view of one embodiment of the combination light and fan fixture showing the flow of air.
Figure 3:
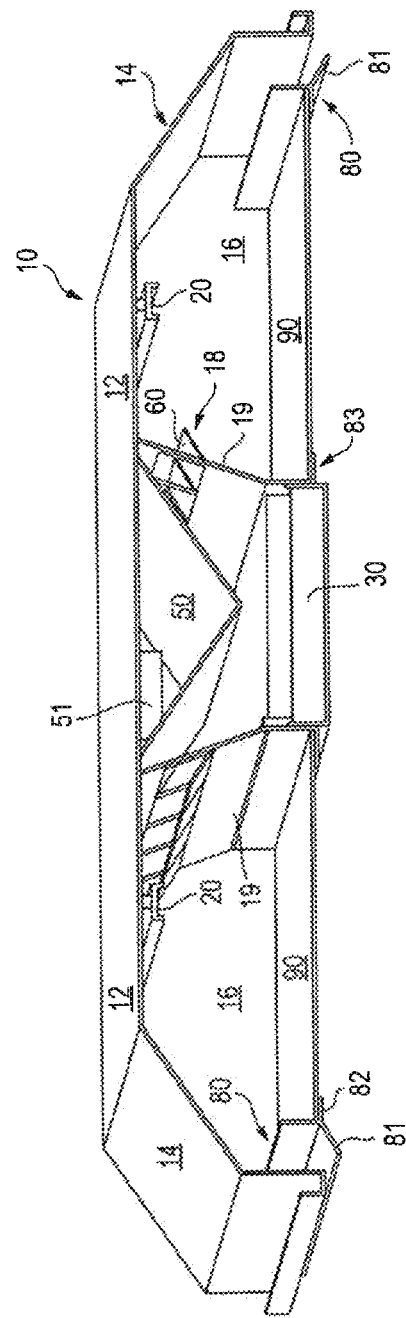
FIG. 3 is a prospective view of one embodiment of the combination light and fan fixture depicting a troffer shell.

A preferred embodiment of the present invention comprises a combination of a fan and LED light fixture. FIGS. 1 and 2 show side sectional views of an embodiment of the present invention depicting a troffer shell 12. FIG. 3 shows a perspective view of a preferred embodiment of the present invention including a troffer shell. The combination fan 10 includes a troffer shell 12 which supports at least one LED light fixture 20 and a fan 30. The fan 30 is supported by a louvered fan holder 18. As shown in FIG. 3, the louvered fan holder 18 has a lower solid portion 19 and an upper open portion 17 that includes several opening and louvers 60 which direct air from the fan chamber 13 along the troffer shell 12. The troffer shell 12 is the same dimensions as a ceiling tile typically 2 ft.×2 ft. or 2 ft.×4 ft. The LED light fixture 20 is preferably positioned along the periphery of the troffer shell 12 such that light from the fixture 20 is not interrupted by the fan 30. The LED light fixture includes an LED lamp 22. The LED light fixture 20 is preferably in the form of a strip which runs the length of the troffer shell 12.

Figure 12:
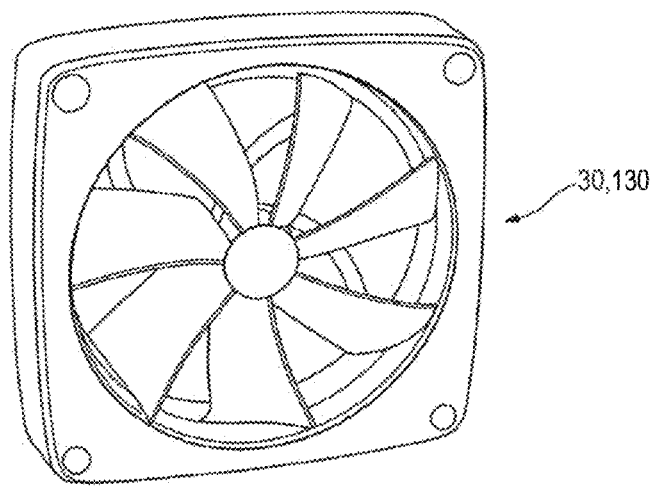
FIG. 12 is a perspective view of an axial fan of the present invention.

The fan 30 preferably includes at least an axial fan as shown in FIG. 12. There may be more than one fan within the fan area 13. The blades 32 of the axial fan 30 force air to move parallel to a shaft 34 about which the blades 32 rotate. Air flow 40 moves axially through the intake of the fan 36 and axially out through the outlet 38 of the fan 30. The flow of air is generally linear trough the intake 36 and the outlet 38. The design of the fan 30 is a function of the blade configuration 32 that creates a pressure of differential that produces airflow 40 across the fan blade 32. The axial fan 30 may consist of anywhere from 2 to 8 blades. The axial fan 30 is connected to a motor 51 and typically operates at high speeds. The typical speed of the axial fan of the present invention operates between 1800 to 4000 RPM to produce airflow in the range of 85 to 150 cubic feet per minute.

Figure 4:
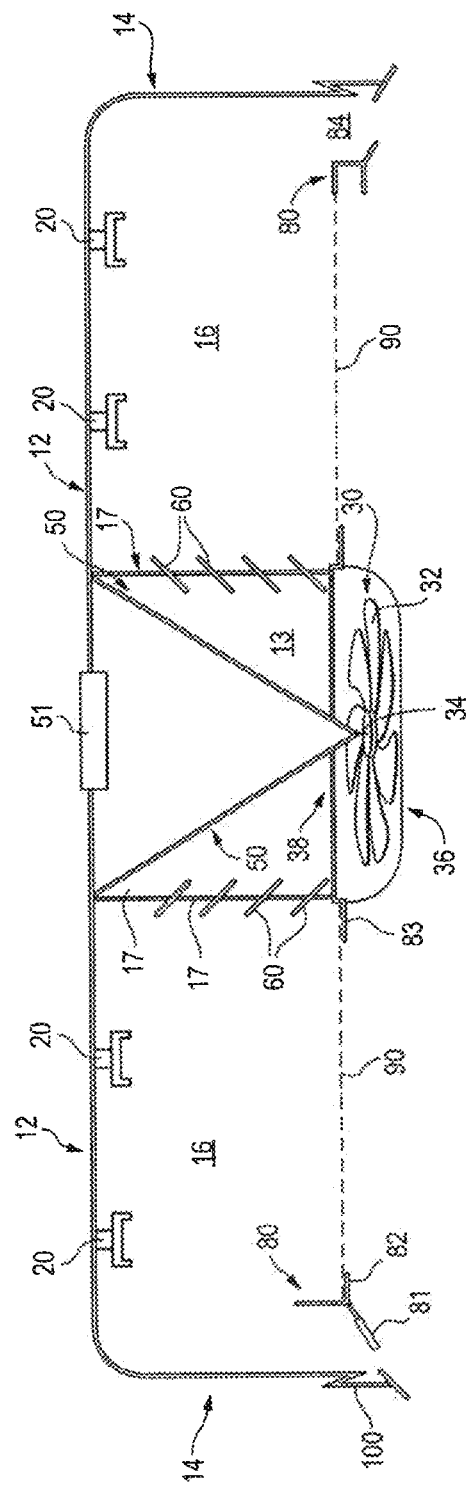
FIG. 4 is a sectional view of one embodiment of the combination light and fan fixture of another embodiment depicting an alternative embodiment of a troffered shell.

As shown in FIG. 2, The configuration of the troffer shelf 12 directs the flow of air from the outlet 38 of the fan 30. Air flows along the troffer shelf 12 and the troffer baffle 14, along the LED light fixture 20. Air passing along the LED light fixture 20 acts to dissipate heat produced by the LED light fixture 20 to reduce the operating temperature of the LED light fixture 20. In essence, the air flow reduces waste heat produced by the LED fixture 20 by conducting the heat away from the fixture 20. FIG. 4 depicts an alternative design of the troffer shelf and the troffer baffle 14. In the alternative design, air is propelled from the fan 30 into the fan chamber 13. The air from the fan 30 is deflected by a diversion mechanism 50, through the opening 17 and directed by louvres 60 into the troffer cavity 16. The louvres 60 are configured to direct the air from the fan along the troffer shell 12 and along the troffer baffles 14. By directing air from the fan 30 along the troffer shell 12 causes the air to circulate along LED light fixtures 20. The air flow helps to reduce the temperature of the LED light fixture 20. The air flow is directed by the troffer baffle through an exit vent 84 formed by the vent 81, the troffer baffle 14 and the lens bracket 80.

Figure 5:
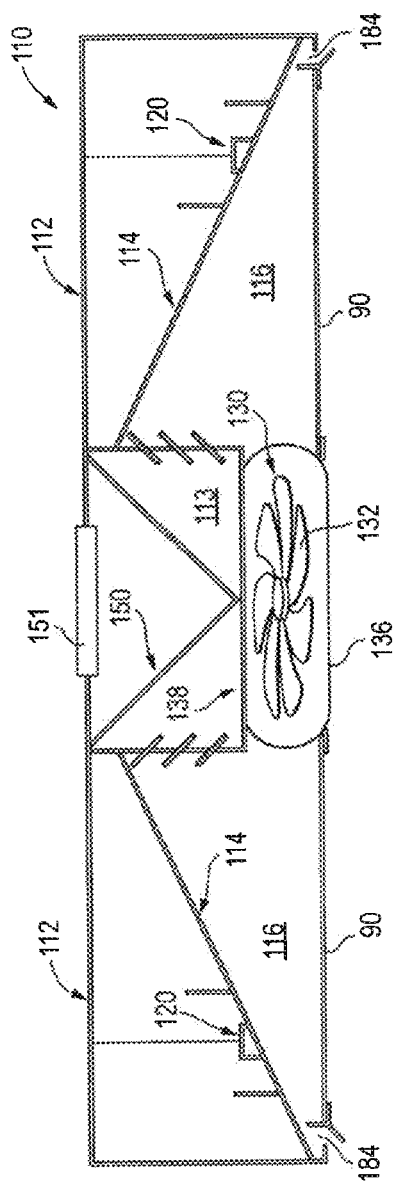
FIG. 5 is a sectional view of one embodiment of the combination light and fan fixture depicting an angled shell showing the flow of air.

In the preferred embodiments of the present invention, there may be a vent and lens bracket 80. The bracket 80 is affixed to the troffer shelf 12 in such a manner to permit air to flow from the troffer cavity 16 through an exit vent 84 formed by a vent 81 in the bracket 80. The vent 84 permits the air heated by LED light fixture 20 to exit the troffer cavity 16. The bracket 80 also includes a lens bracket 82. The lens bracket 82 corresponds with a fan lens bracket 83 to secure a lens 90 in place within the combination LED light and fan 10. The lens 90 provides a solid surface to assist with containing any air from the fan 30 such that it proceeds along the troffer shelf 12 and the troffer baffle 14 to the LED light fixture 20 and through the vent 84. A lens FIG. 5 is not necessary to the invention. However, the lens 90 typically made of a somewhat flexible translucent plastic material. There is a mounting mechanism 100 that is used to affix the combination LED light fixture and fan to an adjacent ceiling tile or bracket.

The embodiments of the present invention incorporate the use of color displayed by the lighting system to affect the environment in which the combination LED light and fan fixture 10 may be implemented. Research has shown that different colors appear to affect behavioral traits in humans. For example, the color yellow is believed to influence a person's self-confidence; the color red is believed to influence a person's physical body, the color blue is believed to influence a person's mind and the color green is believed to influence a person's emotional balance. It is believed that, for example, the combination of a yellow color with a blue color will stimulate a person's emotional balance and mind. The different color combinations may be incorporated into the present invention in numerous ways. In one embodiment of the present invention, the colors blue, red, yellow or green may be applied to the internal surface of the troffer shelf 12 and/or the troffer baffle 14 by means of paint, insert or other known technique. Alternatively, the lens 90 may comprise of the colors blue, red, yellow or green. The colored lens 90 operates to transmit light of the lens color in an indoor space. Finally, the LED light fixture 20 itself may be configured to generate light in the blue, red, yellow or green spectrums by means of the LED lamp 22.

The combination fan of the present invention may utilize the stepped-fan blade design depicted in the pending patent application Ser. No. 14/814,161, 15/043,923 and 15/346,913 incorporated herein by reference in the entirety. The benefits of the stepped-blade design are set-forth in detail in the pending patent applications referenced herein and need not be repeated in this provisional application and are not shown in the drawings. The stepped-fan blade design greatly improves the air flow characteristics of the fan 30.

Figure 9:
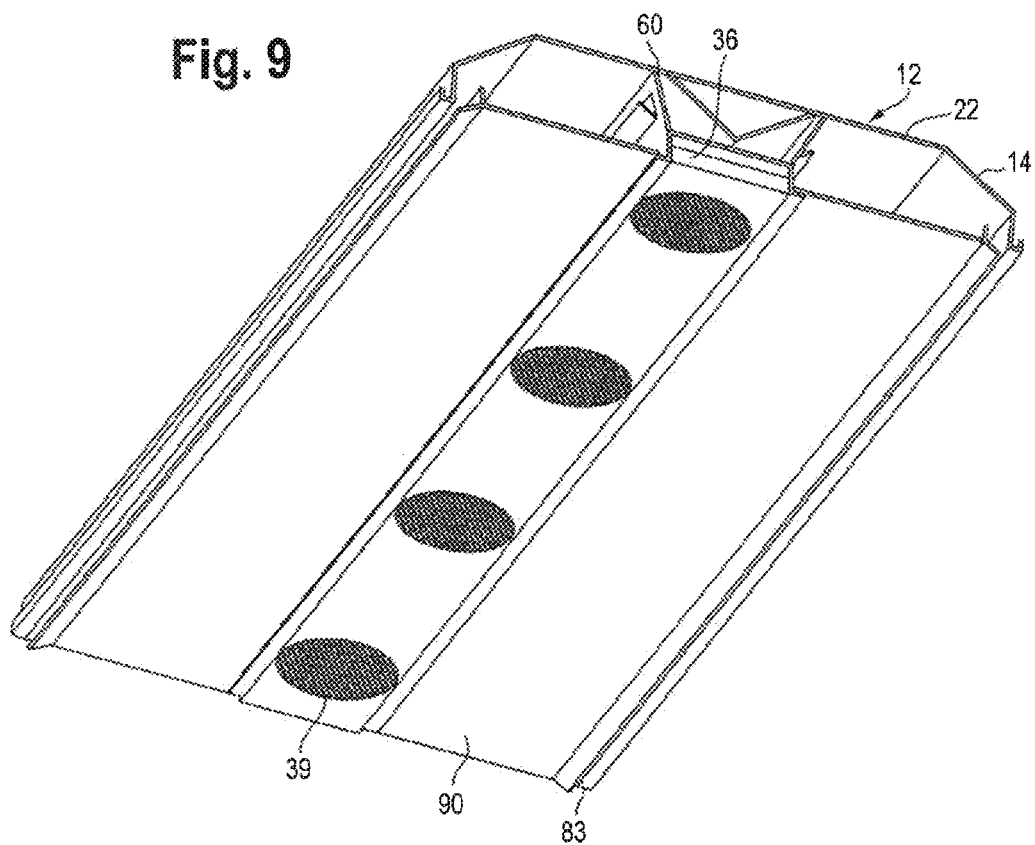
FIG. 9 is a perspective view of an embodiment of the present invention utilizing multiple round grills.
Figure 9A:
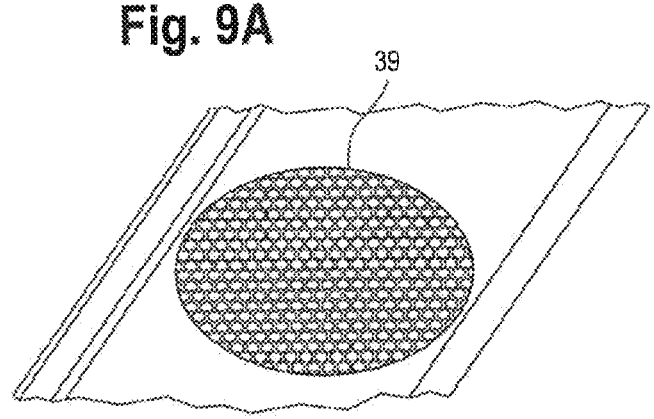
FIG. 9(a) is a perspective view of the fan grate depicted in FIG. 9.
Figure 10:
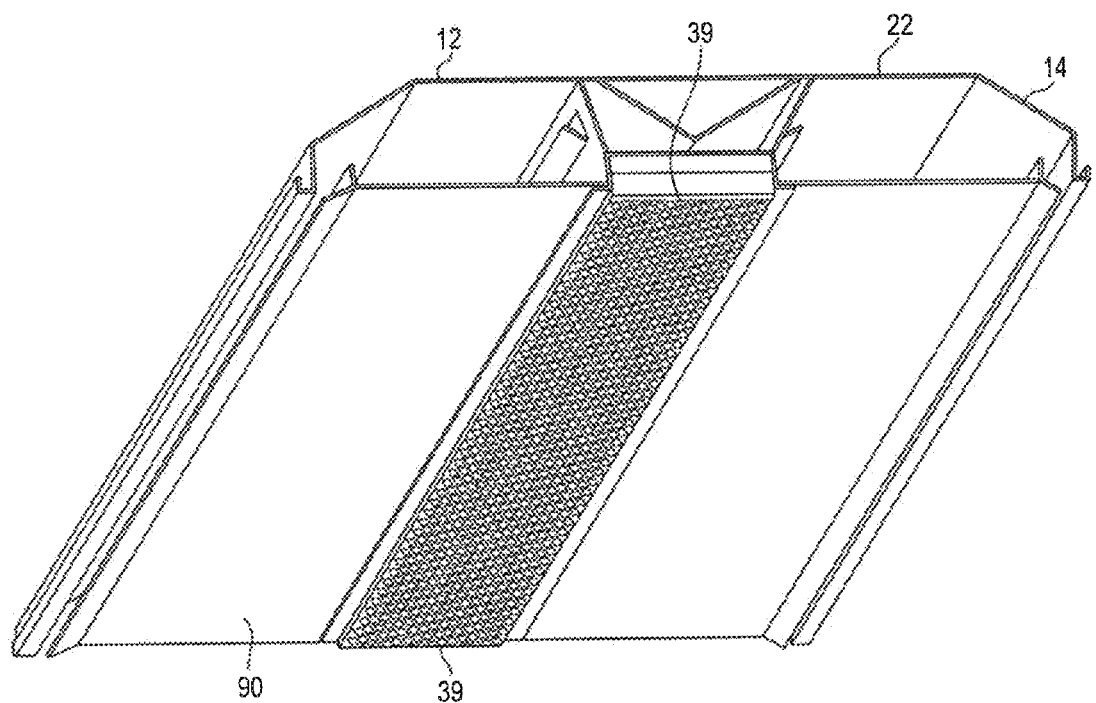
FIG. 10 is a perspective view of an embodiment of the present invention utilizing a single grill and lens.
Figure 10A:
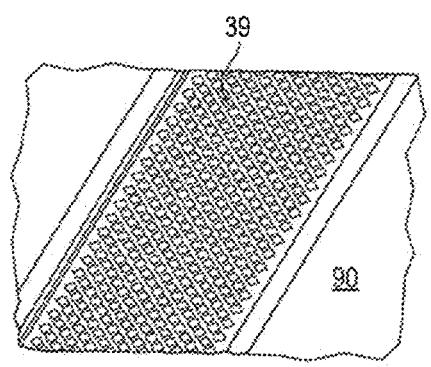
FIG. 10(a) is a perspective view of the fan grate depicted in FIG. 10.

As shown in FIGS. 9, 9(a), 10 and 10(a), the fan intake 36 may include decorative perforations and/or a grill 39. The grills 39 may be of a circular configuration as shown in FIGS. 9 and 9(a). Alternatively, the grill 39 may extend the length of the fan intake 36 as shown in FIGS. 10 and 10(a). The air intake 36 may also include a filter (not shown). Alternatively, the filter may be positioned at the air outlet 38 or at a grill covering the combination fan 39. The filter serves to clean air flowing through the fan of dust and other fine particles. The filters may be removed for cleaning or replacement on a periodic basis. The embodiments shown in FIGS. 10 and 10(a) are more adapted to accommodate a filter.

The preferred embodiment of the combination fan and LED light system further includes an air diversion mechanism 50. The air diversion mechanism 50 is positioned within the cavity of the fan chamber 13. The physical configuration of the air diversion mechanism 50 is such that it directs air exiting the fan outlet 38 through the louvered openings 17 or diffuser in the louvered fan holder 18. In the preferred embodiment, the air diversion mechanism 50 is in the shape of a prism as shown in FIGS. 1 thru 7. Alternatively, the air diversion mechanism 50 may be in the shape of a pyramid (FIG. 8), cone, pentagon, triangle or other suitable shape to divert air from the fan chamber 13, through the openings 17 and into the troffer chamber 16 along the LED light fixture 20. The air diversion mechanism directs air towards opening 17 along louvered vents 60 positioned along the inside fan chamber 13. The vents 17 may include louvres 60 to assist in directing the air in the desired direction. Positioned within the air diversion mechanism 50 is a ballast housing 51 for LED lighting ballast, drivers and wires. The ballast housing 51 houses the wiring for both the LED lighting system and the fan to allow for a single hook-up to the electrical outlets or connections positioned within the ceiling.

The air exiting from the fan cavity 13 is directed along an airflow troffer shelf 12 to the troffer baffle 14. Air may alternatively be directed through a cooling chamber, which is not shown, but functions to cool the components located in the ballast housing 51, as well as, the LED lighting components.

The interior surface of the troffer shelf 12 and troffer baffle 14 are preferably coated with a Miro-Micro Matt wet paint produced by Alanod. The paint helps to maintain airflow along the surface, as well as, maintain a clean dust-free surface. The paint can be applied in any of the colors discussed above to affect the environment.

As shown in FIG. 2, air 40 enters the fan 30 and is expelled by the fan blades 32 into the air chamber 13. Air flow in the fan chamber is generally laminar. Air is forced into the air chamber 13 and is directed by a louvre 60 through an opening in the fan chamber 13 into the troffer cavity 16. The air (shown in arrows) has generally a laminar flow along the troffer shelf 12 and troffer baffle 14. As the flow of air from the fan 30 extends towards the exterior perimeter of the housing in the vent 84, the flow becomes more turbulent and mixes with the surrounding air such that the air exiting through the vent 81 is more turbulent in nature. The preferred direction of the air-flow is such that the intake 36 of the fan 30 draws air from the lower portion of a space and distributes the air along the upper portion of the space. Air along the lower portion of an area tends to be cooler than air that resides at the upper portion of an area. The cooler air is pulled into the fan 30 and distributed from the cavity is used to cool and clean the LED light fixture 20, the LED cover 24 and/or the LED light bulb 22. In an alternative embodiment, the direction of the airflow may be reversed.

Figure 6:
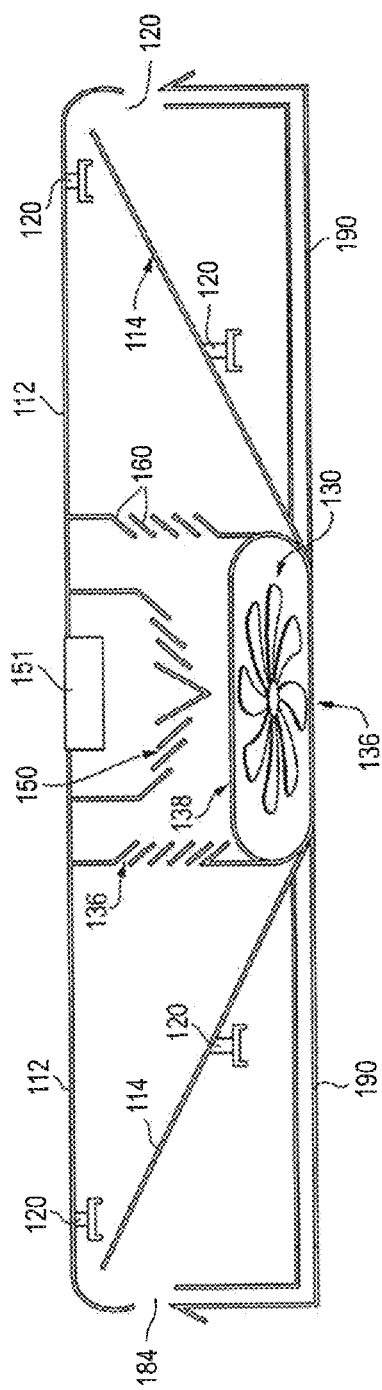
FIG. 6 is a sectional view of an alternative embodiment of the combination light and fan fixture depicting another embodiment of the angled deflection mechanism.

An alternative preferred embodiment of the present invention comprises a combination of a fan and LED light fixture. FIGS. 4, 5 and 6 show views of different embodiments of the present invention. As shown in FIGS. 5 and 6, the combination fan 110 includes a housing 112 which supports at least one LED light fixture 120 and a fan 130. The housing is the same dimensions as a ceiling tile typically 2 ft.×2 ft. or 2 ft.×4 ft. The LED light fixture 120 is preferably positioned along the periphery of the housing 112 such that light from the fixture 120 is not interrupted by the fan 130. The LED light fixture includes an LED light bulb 122.

The fan 130 preferably includes an axial fan. The blades 132 of the axial fan force air to move parallel to a shaft 134 about which the blades 132 rotate. The flow of air 140 is axially through the intake of the fan 136 and axially out through the outlet 138 of the fan 130. The flow of air is linear trough the intake 136 and the outlet 138. The design of the fan 130 is a function of the blade configuration 132 that creates a pressure of differential that produces airflow 140 across the fan blade 132. The axial fan 130 may consist of anywhere from 2 to 8 blades. The axial fan 130 is connected to an energy source (not shown) and typically operates at high speeds. The typical speed of the axial fan of the present invention operates between 1800 to 4000 RPM to produce airflow in the range of 85 to 150 cubic feet per minute. The combination fan of the present invention may utilize the stepped-fan blade design depicted in the pending patent applications referenced above.

The fan intake 136 may include decorative perforations and/or a grill 39 as shown in FIGS. 9 and 10. The air intake 136 may also include a filter (not shown). Alternatively, the filter may be positioned at the air outlet 138 or at a screen covering the combination fan 142. The filter serves to clean air flowing through the fan of dust and other fine particles.

The preferred embodiment of the combination fan and LED light system 110 further includes an air diversion mechanism 150. The air diversion mechanism 150 is positioned within the fan chamber 113 of the fan 130. In the preferred embodiment, the air diversion mechanism 150 is in the shape of a prism as shown in FIGS. 5 and 6. Alternatively, the air diversion mechanism 150 may be in the shape of a pyramid (FIG. 7), cone, pentagon, triangle or other suitable shape to divert air to the LED components and into the office space. The air diversion mechanism 150 directs air towards vents 117 positioned along the fan cavity 113. The vents 117 may include louvres 160 to assist in directing the air in the desired direction. Additionally, the air diversion mechanism may have vents to permit a portion of the air circulated by the fan to enter the diversion mechanism 150 to provide a cooling effect on the ballast housing 151.

Figure 13:
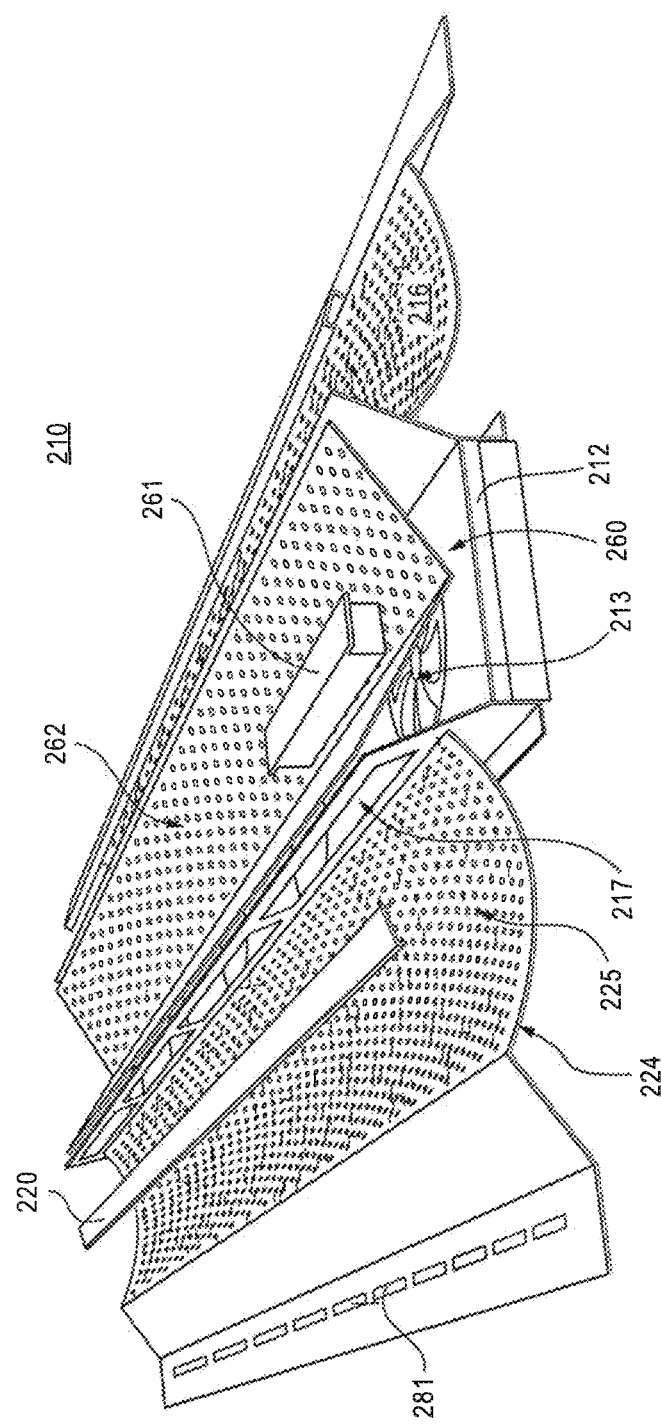
FIG. 13 is a perspective view of an alternative embodiment of the combination light and fan fixture depicting an embodiment of a vented mechanical equipment casing to direct air across the mechanical equipment.
Figure 14:
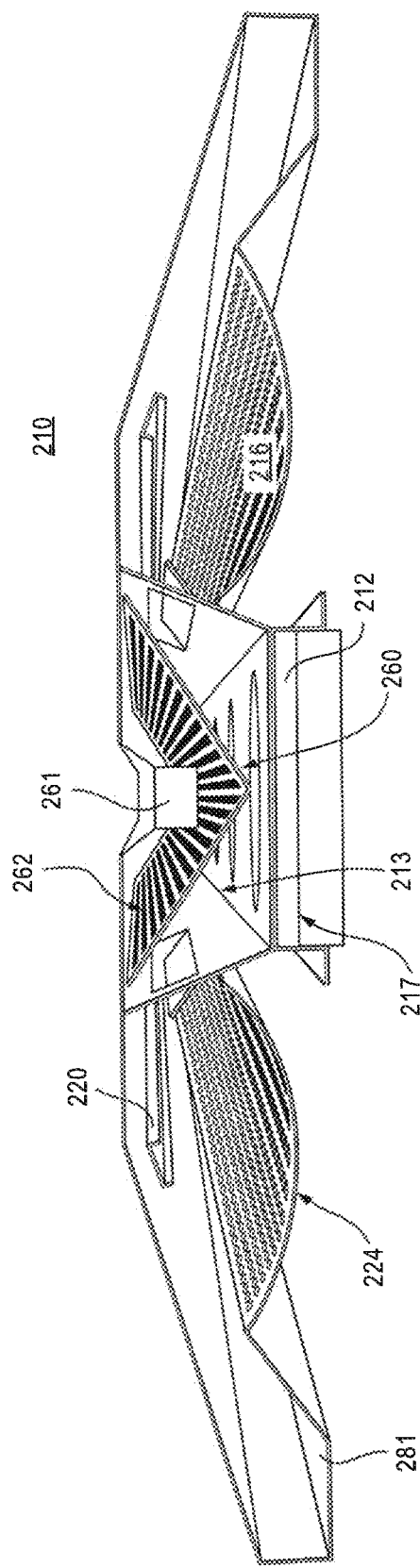
FIG. 14 is a side view of an alternative embodiment of the combination light and fan fixture depicting a vented mechanical equipment casing to direct air across the mechanical equipment.
Figure 15:
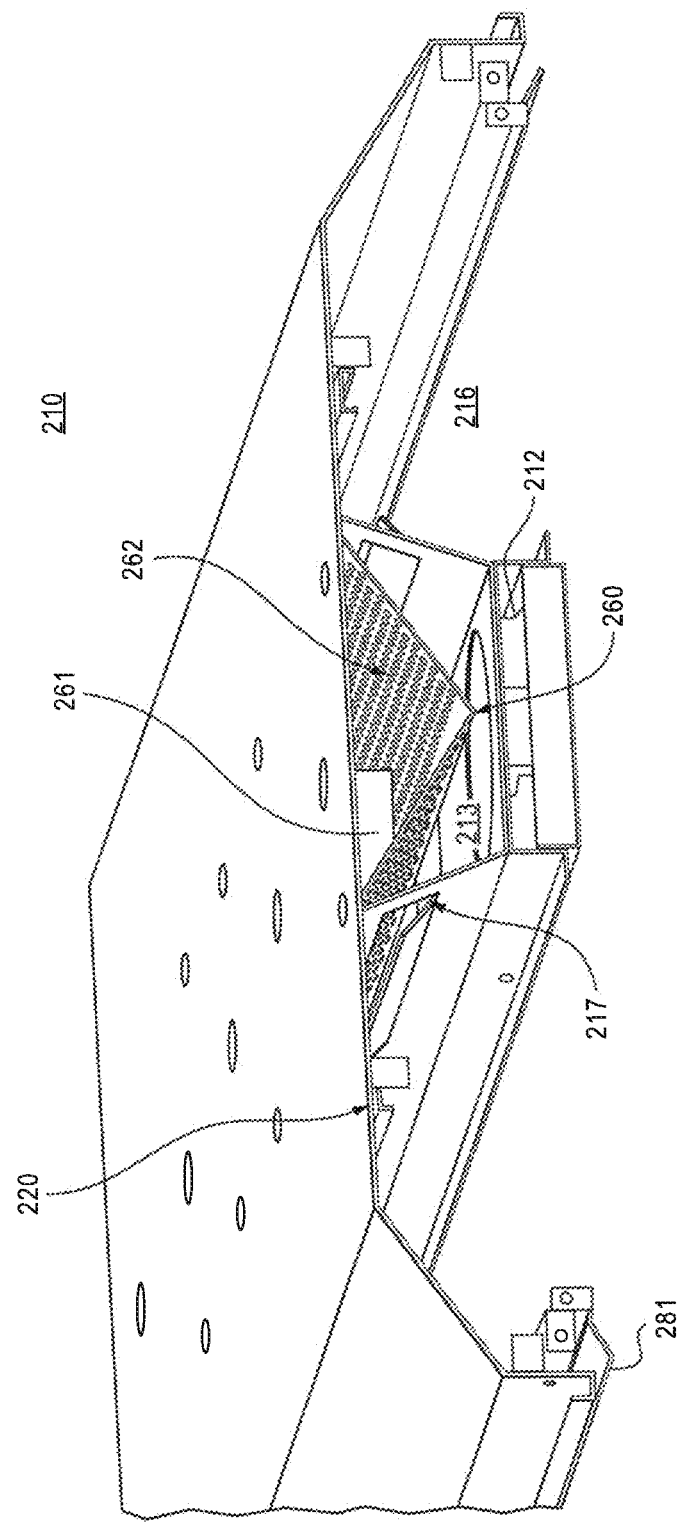
FIG. 15 is a partial view of an alternative embodiment of the combination light and fan fixture depicting a vented mechanical equipment casing to direct air across the mechanical equipment.

FIGS. 13, 14 and 15 depict an embodiment of the present invention having a vented mechanical equipment casing which houses the mechanical equipment (such as the wire harness, drivers, ballast, and power supplies that are associated with the LED light fixture and the fan) and directs the flow of air around the mechanical equipment. As shown in FIGS. 13, 14 and 15, the preferred embodiment of the combination fan and LED light system 210 further includes an air diversion mechanism or called the vented mechanical equipment casing 260 in the present embodiment. The vented mechanical equipment casing 260 is configured to direct a portion of the air flow toward the mechanical equipment 261 housed in an area formed by the vented mechanical equipment casing 260. The vented mechanical equipment casing 260 is positioned in proximity to the fan chamber 212 of the fan (not shown). In preferred embodiment, the vented mechanical equipment casing 260 is configured in the shape of a prism. Alternatively, the vented mechanical equipment casing 260 may be in the shape of a pyramid, cone, pentagon, triangle or other suitable shape to divert air to the LED components and into the office space. The a vented mechanical equipment casing 260 directs air towards vents 217 positioned along the air chamber 213. The vents 217 may include louvres to assist in directing the air in the desired direction. Additionally, the air diversion mechanism may have vents to permit a portion of the air circulated by the fan to enter the vented mechanical equipment casing 260 to provide a cooling effect on the ballast housing which may be contained as part of the mechanical equipment 261.

The present invention may further include a vented mechanical equipment casing 260 which houses the mechanical equipment 261 such as the wire harness, drivers, ballast, and power supplies that are associated with the LED light fixture 220 and the fan. The vented mechanical equipment casing 260, like the air diversion mechanism 250, may be in the shape of a prism. Alternatively, the vented mechanical equipment casing 260 may be in the shape of a pyramid, cone, pentagon, triangle or other suitable shape to divert air to the LED components and into the office space. The vented mechanical equipment casing 260 houses the mechanical equipment 261 such as the wire harness, drivers, ballast, and power supplies that are associated with the LED light fixture 220 and the fan. The vented mechanical equipment casing 260 may openings to direct the flow of air from the air chamber 213 toward the mechanical equipment 261 housed in the area formed by the vented mechanical equipment casing 260. In one embodiment shown in FIGS. 13, 14 and 15, the openings are configured in the form of perforations 262 which are shown, or alternatively, the vented mechanical equipment casing 260 may be configured to include vents or slots (not shown). The perforations 262 in the vented mechanical equipment casing 260 are configured to direct air from the fan chamber 212 and air chamber 213 toward the mechanical equipment 261. By directing the cooler air exiting fan chamber 212 through the mechanical equipment casing 260 toward the mechanical equipment 261, prevents the equipment from overheating, and further prevents dust buildup on the equipment. This results in longer life of the equipment, less maintenance, energy reduction and improved "stack effect." The stack effect is the tendency for warm air to move upwards in a building creating pressure differentials within the building. The stack effect can add to heating and cooling cost by causing heat loss at the top of the building. Movement of air within a building can overcome the problem created by the "stack effect."

In one embodiment of the present invention, the vented mechanical equipment casing 260 is constructed with perforations which are configured to direct a portion of the air exiting the fan chamber 212 toward the mechanical equipment 261. The remaining portion of the air exiting the fan chamber 212 into the air chamber 213 and is directed through an opening in the fan chamber 212 into the troffer cavity 216. As the flow of air from the fan proceeds towards the exterior perimeter of the housing in the vent 281, the flow becomes more turbulent and mixes with the surrounding air such that the air exiting through the vent 281 is more turbulent in nature. The cooler air is distributed from the air chamber 213 into the troffer cavity 216 is used to cool and clean the LED light fixture 220. The troffer cavity may include a LED cover 224 which is configured to include a plurality of perforations 225. The plurality of perforations 224 functions to allow the cooler air in the troffer cavity 216 to exit the troffer cavity 216 through the plurality of perforations 225 in addition to exiting through the vent 281. This allows for enhanced air circulation thought the troffer cavity 216 as well as allowing for enhanced circulation into the physical space below the combination fan and LED light system 210.

Figure 7:
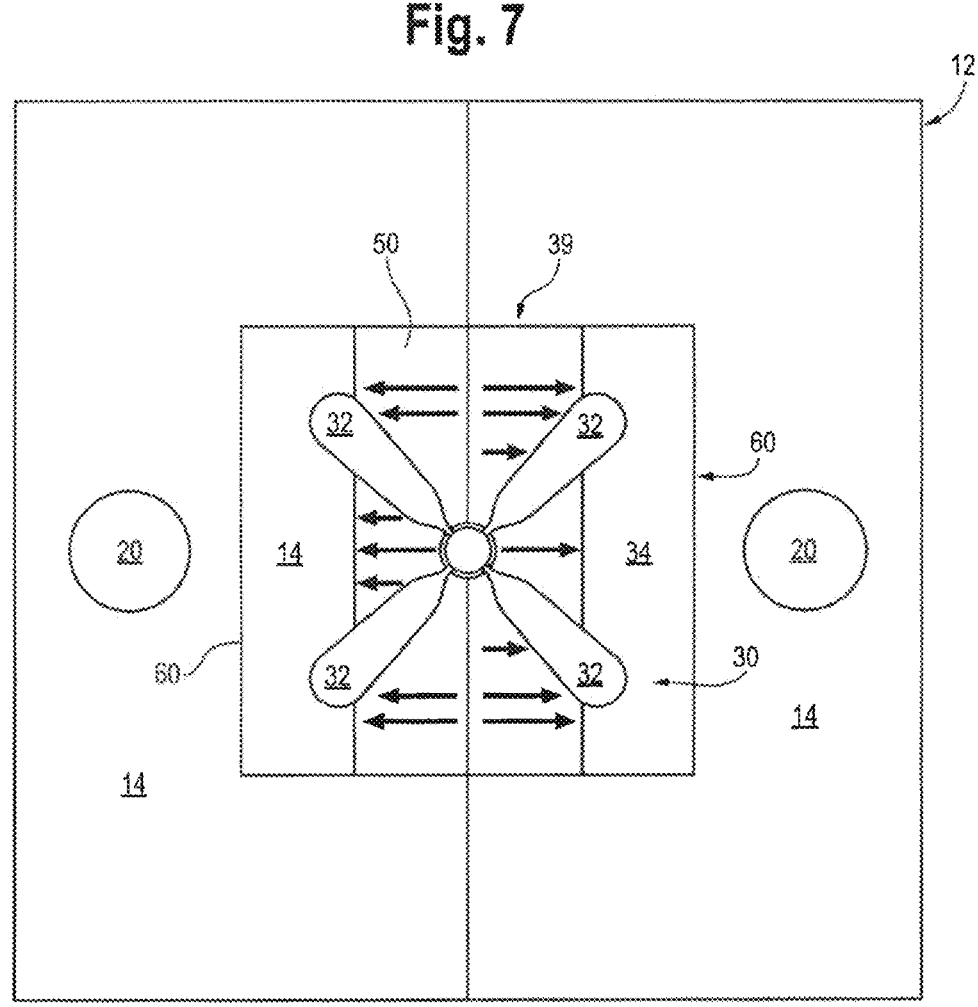
FIG. 7 is a bottom view of one embodiment of the combination light and fan fixture.
Figure 8:
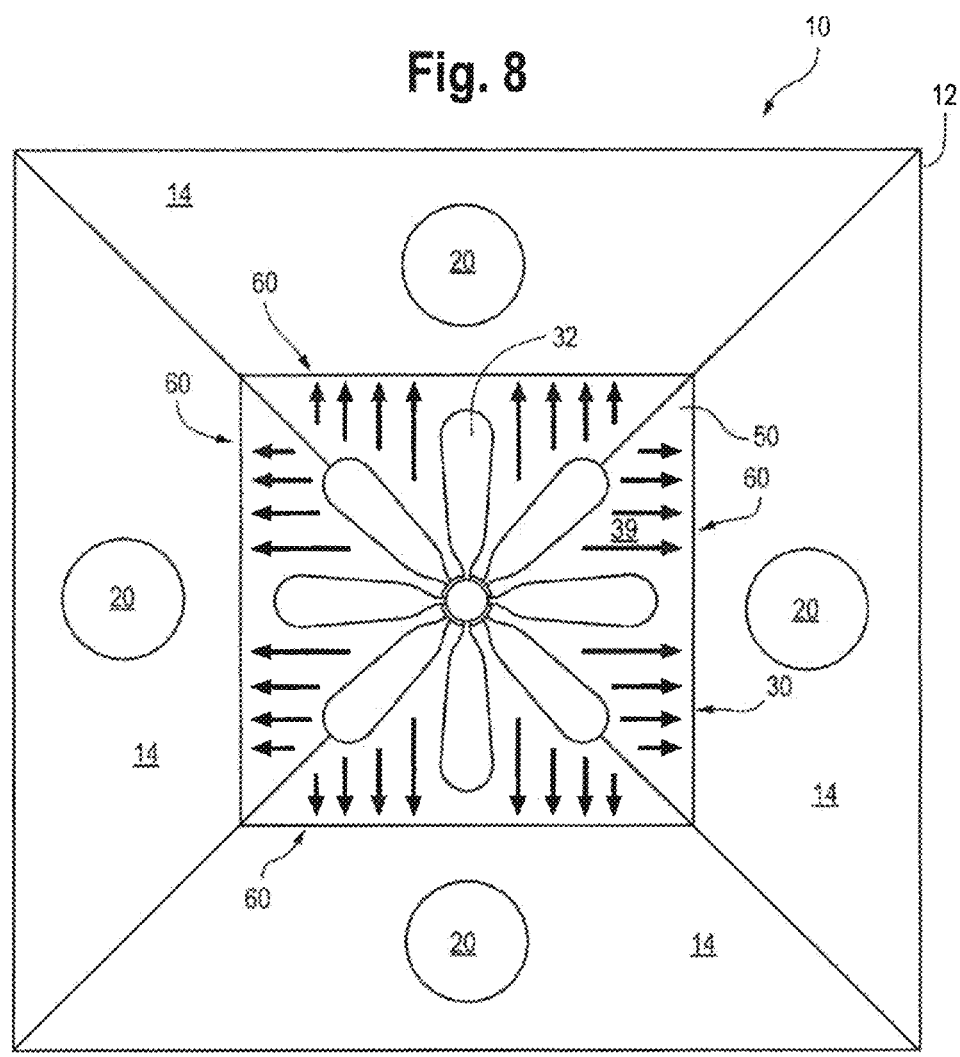
FIG. 8 is a bottom view of an alternative combination light and fan fixture having 4 LED lights.

As shown in FIGS. 6 and 7, the air exiting from the fan cavity 116 is directed along an airflow surface on the lower housing 114 air may alternatively be directed through a cooling chamber, which is not shown but functions to cool the fan components, as well as, the LED lighting components. The internal surface of the lower housing 114 is preferably coated with a Miro-Micro Matt wet paint produced by Alanod. The paint helps to maintain airflow along the surface, as well as, maintain a clean dust-free surface. The airflow 140 has two general components. The air that exits the fan cavity 113 generally has a laminar flow along the airflow surface of the lower housing portion 114. As the flow of air from the fan 130 extends towards the exterior perimeter of the housing 112 through the vent 184, the flow becomes more turbulent and mixes with the surrounding air. The preferred direction of the air-flow is such that the intake 136 of the fan 130 draws air from the lower portion of a space and distributes the air along the upper portion of the space. Air along the lower portion of an area tends to be cooler than air that resides at the upper portion of an area. The cooler air is pulled into the fan 130 and distributed from the cavity is used to cool and clean the LED light fixture 120, and/or the LED light bulb 122.

Figure 11:
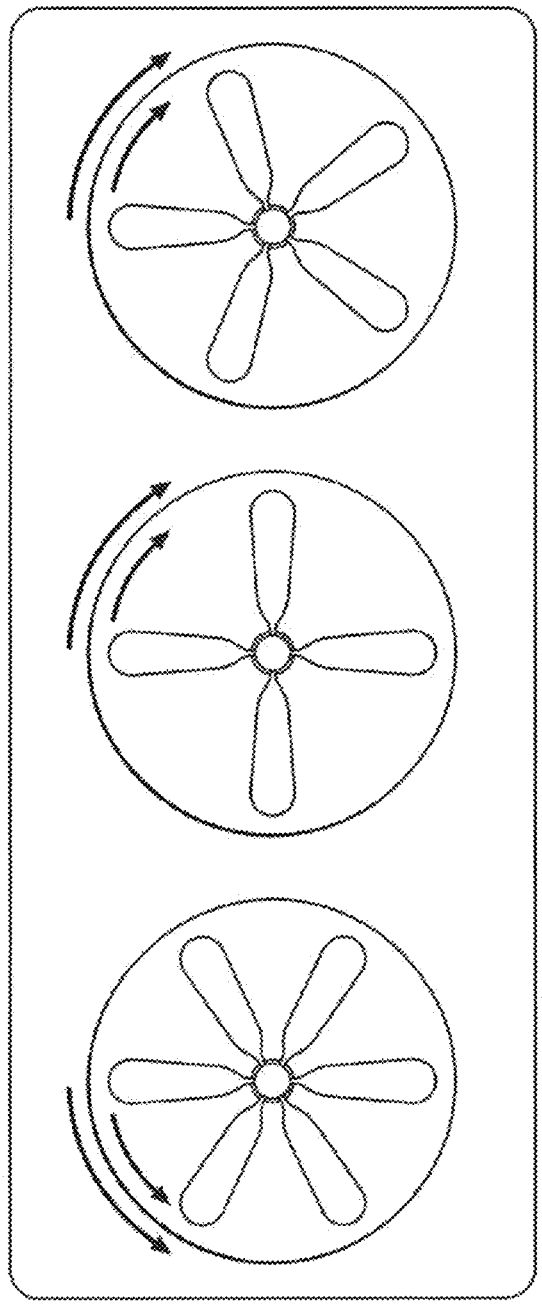
FIG. 11 is a view of the present invention incorporating multiple fan blades.

As shown in FIG. 11, the combination fan may include two or more fans 30. In the multiple fan configuration, it is beneficial that adjacent fans rotate in different directions to provide a more even distribution of air along the fan 30. It is important to note that the adjacent fans rotate in opposite directions.

FIG. 12 depicts the typical axial fan 30 and 130 that is used in the invention.

It should be understood that there are many components to the inventions of the combined fan. While specific combinations of elements are disclosed in specific embodiments, it should be understood that any combination of the different features may be utilized in the combined fan.

The foregoing disclosure and description of the invention are illustrating and explanatory thereof, and various changes in the size, shape and materials as well as in the details of illustrated construction may be changed without departing from the spirit of the invention.

It is understood that the invention is not limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An air movement and recirculation device comprising:
a housing, said housing including a fan chamber, an air chamber positioned adjacent the fan chamber and a mechanical equipment cooling area formed by a mechanical equipment casing;
the housing including a frame;
a first fan positioned in the housing within a fan cavity wherein the fan rotates in a first direction to generate an air flow from the fan chamber to the air chamber, the fan aligned with a fan intake grill in the housing;
an air diversion mechanism affixed to the housing in proximity of the fan cavity wherein the air diversion mechanism includes a first vent configured to divert a portion of the air exiting the air chamber into the troffer cavity;
an LED light fixture having a determined temperature affixed to the housing and positioned in the troffer cavity wherein a portion of the LED light fixture is positioned within the troffer cavity and the troffer cavity configured to direct a flow of the air from the air chamber such that the flow of air operates to cool the LED light fixture; and
the vented mechanical equipment casing affixed to the housing and configured to form mechanical equipment cooling area wherein the vented mechanical equipment casing houses mechanical equipment associated with an LED light fixture positioned in the mechanical equipment cooling area, the mechanical equipment having a predetermined temperature;
the vented mechanical equipment casing configured to include an opening to direct a portion of the air exiting the air chamber into the mechanical equipment cooling area wherein the flow of air into the mechanical equipment cooling area is directed to encounter the equipment and operates to reduce the predetermined temperature of the equipment.

2. The air movement and recirculation device of claim 1, wherein the housing has the dimensions of a ceiling tile.

3. The air movement and recirculation device of claim 1, wherein the housing has a length and a width in the dimensions of a ceiling tile, wherein the width is 2 feet, and the length is 4 feet.

4. The air movement and recirculation device of claim 1, wherein the opening in the vented mechanical equipment casing is a plurality of vents.

5. The air movement and recirculation device of claim 1, wherein the opening in the vented mechanical equipment casing is a plurality of slots.

6. The air movement and recirculation device of claim 1, wherein the opening in the vented mechanical equipment casing is a plurality of perforations.

7. The air movement and recirculating device of claim 1, wherein the vented mechanical equipment casing is configured in a pyramidal shape.

8. The air movement and recirculating device of claim 1, wherein the vented mechanical equipment casing is configured in a cone shape.

9. The air movement and recirculating device of claim 1, wherein the vented mechanical equipment casing is configured in a triangular shape.

10. The air movement and recirculating device of claim 1, further comprising an LED light cover affixed to the housing configured to include an opening in the cover to allow for air to exit from the air chamber.

11. The air movement and recirculating device of claim 10, wherein the opening in the LED light cover comprises a plurality of perforations.

\* \* \* \* \*